Sept. 24, 1957
R. C. HARE
2,807,273
POWER TRANSMISSION
Filed March 7, 1955
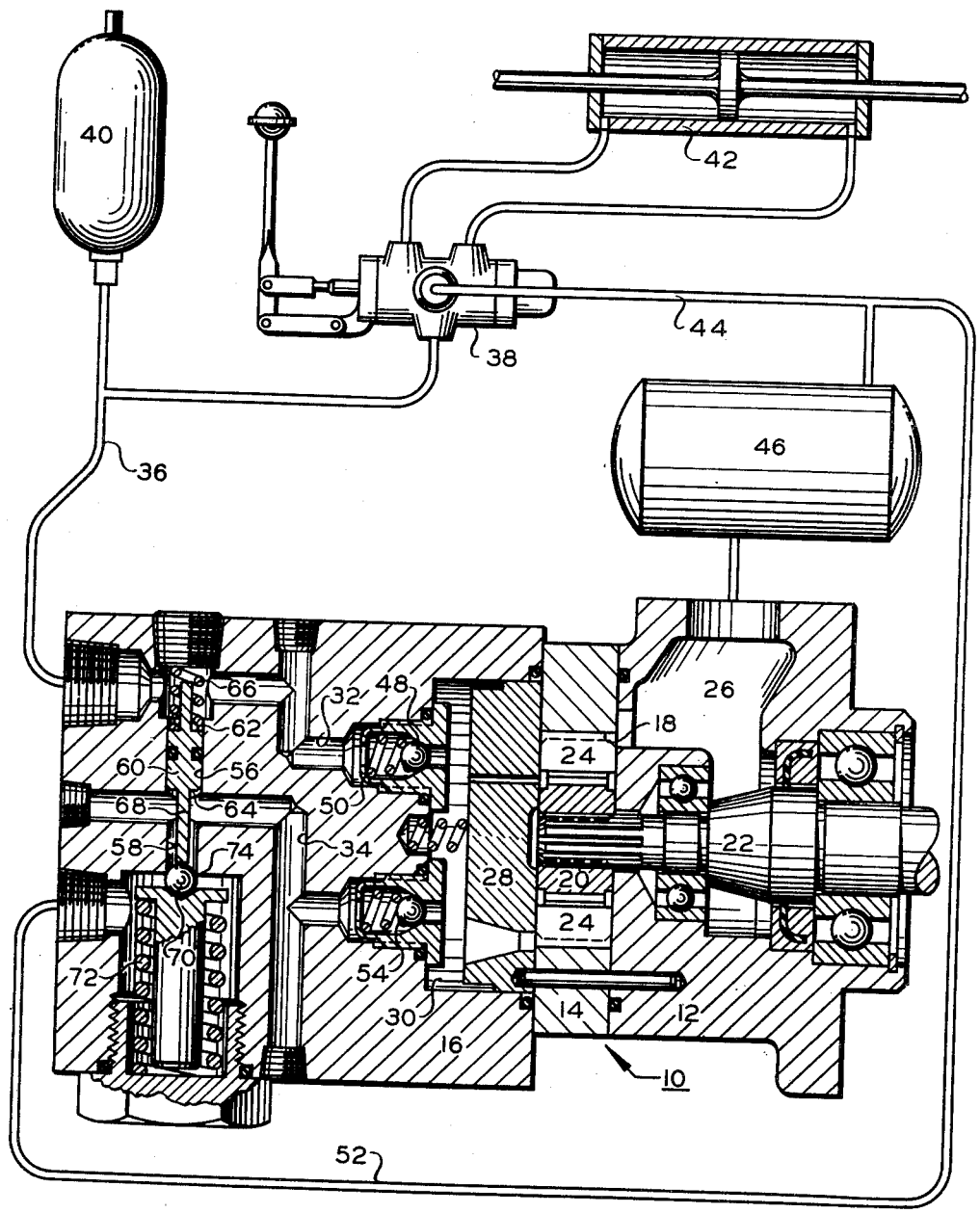
INVENTOR.
RICHARD C. HARE
BY
*Ralph L. Tweedale*
ATTORNEY

United States Patent Office 2,807,273
Patented Sept. 24, 1957

2,807,273
POWER TRANSMISSION

Richard C. Hare, Detroit, Mich., assignor to Vickers Incorporated, Detroit, Mich., a corporation of Michigan Application March 7, 1955, Serial No. 492,365

5 Claims. (Cl. 137—108)

This invention relates to power transmissions and is particularly applicable to those of the type comprising two or more fluid pressure energy translating devices, one of which may function as a pump and another as a fluid motor.

More particularly the invention relates to an improved pump unloading mechanism for use in such a power transmission.

In many power transmissions a fluid motor is only intermittently operated. To conserve power it is desirable that the pump be unloaded during periods of motor non-use. Since the motor must usually be instantly available for work, such circuits ordinarily include an accumulator for storing fluid under pressure. An unloading valve is provided which diverts the pump discharge back to the reservoir at lower pressure whenever the accumulator is adequately charged.

Many prior unloading valves have been subject to erratic operation and have had a tendency to hang up; that is, under certain conditions they fail to completely unload the pump even though the accumulator may be fully charged.

It is an object of this invention to provide an improved unloading valve for such a transmission.

More particularly, it is an object of this invention to provide a low cost unloading valve which is sensitive and dependable, and in which the hanging up tendency is minimized.

Further objects and advantages of the present invention will be apparent from the following description, reference being had to the accompanying drawing wherein a preferred form of the present invention is clearly shown.

In the drawing:

The single figure illustrates a power transmission incorporating the present invention.

Referring now to the drawing, there is shown a pump generally designated 10. Pump 10 may be of any suitable type but has been illustrated as of the radially sliding vane type described in detail in the U. S. patent to Gardiner, No. 2,544,988. Pump 10 includes a body 12, a ring 14, and a head 16. A pumping chamber 18 in ring 14 telescopically receives a rotor 20, which is supported on, and driven by, a shaft 22. Vanes 24 divide the pumping chamber into a plurality of working spaces which alternately expand and contract, taking fluid from the inlet chamber 26 and discharging it through a pressure plate 28 into a manifolding pressure chamber 30 in the pump head 16. Pump head 16 includes therein a pair of passages 32 and 34. Passage 32 forms part of a utilization branch circuit which includes a conduit 36 leading to a four-way valve 38 and to an accumulator 40. Valve 38 is connected to control an intermittently operated fluid motor 42. A return line 44 for the valve 38 leads to a reservoir 46.

A spring biased check valve 48 controls communication between passage 32 and the pressure chamber 30. Valve 48 is so oriented as to permit flow from pressure chamber 30 to passage 32 and to block return flow. Due to the load of spring 50, valve 48 presents small, but appreciable, resistance to the flow of fluid from chamber 30 to passage 32. Thus pressure downstream of valve 48 will be of a lower magnitude than the pressure in chamber 30, while flow takes place through the valve 48.

Passage 34 forms part of a venting passage which includes a conduit 52 leading to the reservoir 46. A spring biased check valve 54, having substantially the same resistance to flow therethrough as valve 48, is interposed between passage 34 and pressure chamber 30. Valve 54 is provided to normally equalize pressures in passages 32 and 34 at points downstream from valves 48 and 54, while flow takes place through valve 48, for a purpose to be hereinafter described.

A bore 56 extends into head 16 to transversely intersect passage 32 and coaxially align with the portion 58 of passage 34. Bore 56 has an imperforate plunger 60 slidable therein and in fluid-sealing engagement therewith. Plunger 60 thus has pressure downstream of valve 48 in the utilization branch imposed on its outer area 62, and pressure downstream of valve 54 in the venting branch imposed on an equal and opposed area 64. A light spring 66 biases plunger 60 to the position illustrated wherein a push rod 68 lightly contacts a ball type control valve 70. Control valve 70 is biased by a spring 72 against a seat 74 and controls communication between the passage 34 and the conduit 52 leading to reservoir 46. Spring 72 is a relatively heavy spring and the load thereof controls the pressure at which venting of pump 10 begins.

The seat 74 is selected to have an area somewhat smaller than the end area of plunger 60. The ratio between these areas controls the pressure differential between loading and unloading of pump 10.

In operation, with the accumulator 40 in a discharged condition, the delivery from pump 10 passes over the check valve 48 and through passage 32 and conduit 36 of the utilization branch. Fluid pressure is also conducted from pressure chamber 30 into the passage 34 of the venting branch and is imposed on control valve 70. As was heretofore noted, valves 48 and 54 present substantially the same resistance to flow therethrough. Thus pressure in passages 32 and 34, and hence pressures on opposite ends of plunger 60, are equal while accumulator 40 is being charged. When pressure in passage 34 reaches a value controlled by the area of seat 74 and the load of spring 72, valve 70 will crack and thus divert a portion of the pump flow through the venting branch to the reservoir 46. The effect of this diversion is to drop the pressure in passage 34 relative to pressure in passage 32. Since up to the cracking point of valve 70 pressures on opposite ends of plunger 60 were equal, a very small quantity of fluid need be diverted through the venting circuit to produce an appreciable pressure differential across the plunger 60. The action is a self-generating one, with further opening of control valve 70 increasing the pressure differential between passages 32 and 34 and thus increasing the force exerted on control valve 70 by the plunger 60. Control valve 70 is almost instantaneously carried to its full open position by plunger 60, thus establishing a low pressure by-pass for the entire discharge of pump 10. Since dropping of pressure in passage 34 also effects a pressure drop in chamber 30, valve 48 seats to prevent flow from passage 32 back into the pressure chamber 30. As heretofore noted, the end areas of plunger 60 are greater than the area of seat 74. Thus pressure in passage 32, which is imposed on the area 62 of plunger 60, must drop to an appreciably lower value than the pressure value in passage 34 which initiated the venting before control valve 70 will re-seat.

There has thus been provided an improved, low cost and sensitive pump unloading mechanism.

While the form of embodiment of the invention as

What is claimed is as follows:

1. Unloading mechanism for a fluid pump, comprising: conduit means connectable with the pump outlet and having a utilization branch and a venting branch; check valve means in the utilization branch oriented to block flow toward the pump; a normally closed, pressure responsive control valve in the venting branch, said control valve having a pressure effective area exposed to pressure in the venting branch, said area being so oriented as to open said control valve in response to pressure in the venting branch; plunger means adapted to contact the control valve and urge it toward an open position, said plunger having a first area exposed to pressure in said venting branch upstream from said control valve and a second, opposed area exposed to pressure in the utilization branch downstream of the check valve; and means in the venting branch upstream from said first area for substantially equalizing pressures on the opposed areas of the plunger while the control valve is closed.

2. Unloading mechanism for a fluid pump, comprising: conduit means connectable with the pump outlet and having a utilization branch and a venting branch; resiliently biased check valve means in the utilization branch oriented to block flow toward the pump; a normally closed, pressure responsive control valve in the venting branch, said control valve having a pressure effective area exposed to pressure in the venting branch, said area being so oriented as to open said control valve in response to pressure in the venting branch; plunger means adapted to contact the control valve and urge it toward an open position, said plunger having a first area exposed to pressure in said venting branch upstream from said control valve and a second, opposed area exposed to pressure in the utilization branch downstream of the check valve; and resiliently biased valve means in the venting branch upstream from said first area for substantially equalizing pressures on the opposed areas of the plunger while the control valve is closed.

3. Unloading mechanism for a fluid pump, comprising: conduit means connectable with the pump outlet and having a utilization branch and a venting branch; check valve means in the utilization branch, having a predetermined resistance to flow from the pump and oriented to block flow toward the pump; a normally closed, pressure responsive control valve in the venting branch, said control valve having a pressure effective area exposed to pressure in the venting branch, said area being so oriented as to open said control valve in response to pressure in the venting branch; plunger means adapted to contact the control valve and urge it toward an open position, said plunger having a first area exposed to pressure in said venting branch upstream from said control valve and a second, opposed area exposed to pressure in the utilization branch downstream of the check valve; and means in the venting branch upstream from said first area having substantially the same resistance to flow as said check valve, for substantially equalizing pressures on the opposed areas of the plunger while the control valve is closed.

4. Unloading mechanism for a fluid pump, comprising: conduit means connectable with the pump outlet and having a utilization branch and a venting branch; resiliently biased check valve means in the utilization branch, having a predetermined resistance to flow from the pump and oriented to block flow toward the pump; a normally closed, pressure responsive control valve in the venting branch, said control valve having a pressure effective area exposed to pressure in the venting branch, said area being so oriented as to open said control valve in response to pressure in the venting branch; plunger means adapted to contact the control valve and urge it toward an open position, said plunger having a first area exposed to pressure in said venting branch upstream from said control valve and a second, opposed area exposed to pressure in the utilization branch downstream of the check valve; and resiliently biased valve means in the venting branch upstream from said first area having substantially the same resistance to flow as said check valve, for substantially equalizing pressures on the opposed areas of the plunger while the control valve is closed.

5. Unloading mechanism for a fluid pump, comprising: a manifold chamber for receiving the discharge of the pump; a utilization branch and a venting branch extending from said chamber; non-return valve means in each of said branches, having substantially the same resistance to flow from said chamber; a normally closed, pressure responsive control valve in the venting branch, said control valve having a pressure effective area exposed to pressure in the venting branch, said area being so oriented as to open said control valve in response to pressure in the venting branch; and plunger means adapted to contact the control valve and urge it toward an open position, said plunger having a first area exposed to pressure downstream of said non-return valve means in said venting branch and a second, opposed area exposed to pressure downstream of said non-return valve means in the utilization branch.

References Cited in the file of this patent

UNITED STATES PATENTS

| | | |
|---|---|---|
| 2,015,801 | Johnson | Oct. 1, 1935 |
| 2,342,001 | Magnuson | Feb. 15, 1944 |
| 2,591,806 | Graham | Apr. 8, 1952 |